United States Patent Office 2,785,146
Patented Mar. 12, 1957

2,785,146

IMPROVING THE STABILITY OF POLYVINYL ALCOHOL

Richard E. Davies, Ridgewood, and Gregory M. Moelter, Basking Ridge, N. J., assignors to Celanese Corporation of America, New York, N. Y., a corporation of Delaware No Drawing. Application August 28, 1953,
Serial No. 377,244

6 Claims. (Cl. 260—45.75)

This invention relates to polyvinyl alcohol and relates more particularly to improving the stability of polyvinyl alcohol to treatments at elevated temperatures.

Polyvinyl alcohol is suitable for the production of filaments, films, coatings and other related articles. In the preparation and use of such articles, it is frequently desirable to subject the same to treatments at elevated temperatures in excess of about 200° C. It has been observed that during such treatments at elevated temperatures there is experienced a discoloration of the polyvinyl alcohol articles so that the treated articles range in color from a light cream or off-white to a dark brown. The discoloration of the polyvinyl alcohol during heat treatment limits the usefulness of articles produced therefrom and is especially objectionable where the preparation of such articles necessarily involves a heat treatment as, for example, in the insolubilization of polyvinyl alcohol filaments, films, coatings and the like.

It is an important object of this invention to provide a polyvinyl alcohol which will be free from the foregoing and other difficulties.

A further object of this invention is to improve the thermal stability of polyvinyl alcohol.

Other objects of this invention will be apparent from the following detailed description and claims.

It has now been discovered that the discoloration of polyvinyl alcohol during heat treatments at temperatures of at least about 200° C. is caused by the presence in said polyvinyl alcohol of traces of alkaline reacting salts. As is well known, polyvinyl alcohol is normally prepared from polyvinyl acetate by the base-catalyzed hydrolysis of the acetyl groups, using as the base such substances as sodium hydroxide, potassium hydroxide, or sodium methylate. Despite careful purification of the polyvinyl alcohol obtained in this manner, there remain in the product traces of alkaline reacting salts such as sodium or potassium acetates. When polyvinyl alcohols containing such salts are heated to elevated temperatures they will discolor, the extent of such discoloration depending upon the quantity of the alkaline reacting salts present, the temperature to which the polyvinyl alcohol is heated, the heating medium and the duration of such heating. Purification of the polyvinyl alcohol to eliminate all traces of these alkaline reacting salts is not commercially feasible.

According to the present invention, the thermal stability of polyvinyl alcohol containing alkaline reacting salts is greatly improved by adding to said polyvinyl alcohol a salt of a strong acid and a weak base, i. e. an acid reacting salt. Polyvinyl alcohol that has been treated in this manner shows little or no change in color when heated to elevated temperatures and is therefore well suited for many uses in which the untreated polyvinyl alcohol would not be acceptable. The quantity of salt of a strong acid and a weak base added to the polyvinyl alcohol may range from about 90 to 110% of the stoichiometric equivalent of the alkaline reacting salt present in the polyvinyl alcohol, best results having been obtained when the quantity of added salt is about 100% of the stoichiometric equivalent of the alkaline reacting salt. When the quantity of added salt is lower than that specified, the polyvinyl alcohol tends to discolor on heating presumably because of the presence of the residual alkaline reacting salt, although the extent of such discoloration is reduced in proportion to the quantity of added salt of a strong acid and a weak base. On the other hand, when larger quantities of added salt than those specified are employed the polyvinyl alcohol also tends to discolor on heating, presumably because of the acid reaction of the added salt.

Suitable salts of weak bases and strong acids that may be added to polyvinyl alcohol in accordance with this invention include, for example, zinc sulfate, aluminum sulfate, potassium aluminum sulfate, and sodium aluminum sulfate. While no particular theory is necessary to an understanding of this invention, it is believed that the stabilizing effect of the added salt results from a metathesis of the alkaline reacting salt present in the polyvinyl alcohol and the acid reacting salt added thereto. For example, when zinc sulfate is added to a polyvinyl alcohol containing potassium acetate, the two salts react forming potassium sulfate and zinc acetate. These two latter salts have a neutral reaction and do not cause the polyvinyl alcohol to become discolored during heating.

The added salts may be incorporated in the polyvinyl alcohol at any point during its production or processing after the hydrolysis of the polyvinyl ester from which the polyvinyl alcohol is made. An especially convenient and effective point for the addition of such salt is during the preparation of the polyvinyl alcohol dope from which the filaments, films, coatings or similar articles are to be prepared. There may also be present in the polyvinyl alcohol, pigments, dyes, nacreous materials, or other substances capable of modifying the appearance or the final properties of the products produced from the polyvinyl alcohol.

Following the production of filaments, films, coatings or similar articles from the polyvinyl alcohol, the said products may be further treated to modify their properties as, for example, to reduce their sensitivity to water. Such treatments may involve the heating of the polyvinyl alcohol products to temperatures in excess of about 200° C. for periods as long as about 15 minutes, or even longer. Polyvinyl alcohol to which a salt of a strong acid and weak base has been added in accordance with this invention shows little or no discoloration during such heat treatment, whereas untreated polyvinyl alcohol shows considerable discoloration during such heat treatment.

The following examples are given to illustrate this invention further.

Example I

There are mixed together 2 liters of an 8% by weight aqueous solution of polyvinyl alcohol and 200 ml. of a 3% by weight aqueous solution of potassium aluminum sulfate. The solution is filtered, reprecipitated in methanol, filtered and dried. The dry polyvinyl alcohol is dissolved in water and cast to form a film. The film is heated for 6 minutes at 215° C. and shows very little discoloration as compared with a film prepared from the same polyvinyl alcohol which has not been treated with potassium aluminum sulfate.

The quantity of added potassium aluminum sulfate (calculated as aluminum sulfate) is equivalent to the stoichiometric quantity of potassium acetate present in the polyvinyl alcohol as determined by ashing the polyvinyl alcohol.

Example II

To an aqueous solution of polyvinyl alcohol prepared by hydrolysis of polyvinyl acetate catalyzed with potassium hydroxide and having an ash content of 0.17% by weight there is added a stoichiometric amount of zinc sulfate, calculating all the ash to be derived from potassium acetate. The solution is cast to form a film which is heated for 6 minutes at 215° C. The film obtained is colorless. When the same polyvinyl alcohol is cast to form a film without the addition of zinc sulfate, and heated for 6 minutes at 215° C., the film turns a slight amber color. When three times the stoichiometric quantity of zinc sulfate is added to the polyvinyl alcohol, and said polyvinyl alcohol is cast to form a film, the film, on heating for 6 minutes at 215° C., turns yellow.

*Example III*

To an aqueous solution of polyvinyl alcohol having an ash content of 0.21% there is added a stoichiometric quantity of potassium aluminum sulfate, calculating all the ash to be derived from potassium acetate. The polyvinyl alcohol dope is spun to form a yarn which is dried and heated for 6 minutes at 215° C. The heated yarn is white. When the same polyvinyl alcohol is formed into yarn without the addition of potassium aluminum sulfate and the yarn obtained is heated for 6 minutes at 215° C., the yarn has a deep yellow color.

The addition of a stoichiometric quantity of zinc sulfate to the polyvinyl alcohol in place of the potassium aluminum sulfate produces a like improvement in the thermal stability of the yarn.

It is to be understood that the foregoing detailed description is given merely by way of illustration and that many variations may be made therein without departing from the spirit of our invention.

Having described our invention, what we desire to secure by Letters Patent is:

1. The process of improving the thermal stability of polyvinyl alcohol containing an alkaline reacting salt as an impurity, which comprises incorporating into an aqueous solution of such polyvinyl alcohol containing a major amount of water a salt of a strong acid and a weak base in an amount between 90 and 110 percent of the stoichiometric quantity necessary to react with said alkaline reacting salt by metathesis to form salts having a neutral reaction which do not cause the polyvinyl alcohol to become discolored during heating.

2. The process of improving the thermal stability of polyvinyl alcohol containing an alkaline reacting salt selected from the group consisting of sodium acetate and potassium acetate as an impurity, which comprises incorporating into an aqueous solution of such polyvinyl alcohol containing a major amount of water a salt of a strong acid and a weak base in an amount between 90 and 110 percent of the stoichiometric quantity necessary to react with said alkaline reacting salt by metathesis to form salts having a neutral reaction which do not cause the polyvinyl alcohol to become discolored during heating.

3. The process of improving the thermal stability of polyvinyl alcohol containing an alkaline reacting salt as an impurity, which comprises incorporating into an aqueous solution of such polyvinyl alcohol containing a major amount of water a salt of a strong acid and a weak base in the stoichiometric quantity necessary to react with said alkaline reacting salt by metathesis to form salts having a neutral reaction which do not cause the polyvinyl alcohol to become discolored during heating.

4. The process of improving the thermal stability of polyvinyl alcohol containing an alkaline reacting salt as an impurity, which comprises incorporating into an aqueous solution of such polyvinyl alcohol containing a major amount of water zinc sulfate in an amount between 90 and 110 percent of the stoichiometric quantity necessary to react with said alkaline reacting salt by metathesis to form salts having a neutral reaction which do not cause the polyvinyl alcohol to become discolored during heating.

5. The process of improving the thermal stability of polyvinyl alcohol containing an alkaline reacting salt as an impurity, which comprises incorporating into an aqueous solution of such polyvinyl alcohol containing a major amount of water potassium aluminum sulfate in an amount between 90 and 110 percent of the stoichiometric quantity necessary to react with said alkaline reacting salt by metathesis to form salts having a neutral reaction which do not cause the polyvinyl alcohol to become discolored during heating.

6. The process of improving the thermal stability of polyvinyl alcohol containing an alkaline reacting salt as an impurity, which comprises incorporating into an aqueous solution of such polyvinyl alcohol containing a major amount of water aluminum sulfate in an amount between 90 and 110 percent of the stoichiometric quantity necessary to react with said alkaline reacting salt by metathesis to form salts having a neutral reaction which do not cause the polyvinyl alcohol to become discolored during heating.

References Cited in the file of this patent

UNITED STATES PATENTS

| | | |
|---|---|---|
| 1,897,856 | Noller | Feb. 14, 1933 |
| 1,920,564 | Jochum et al. | Aug. 1, 1933 |
| 2,395,616 | Dangelmajer | Feb. 26, 1946 |